Patented June 17, 1947

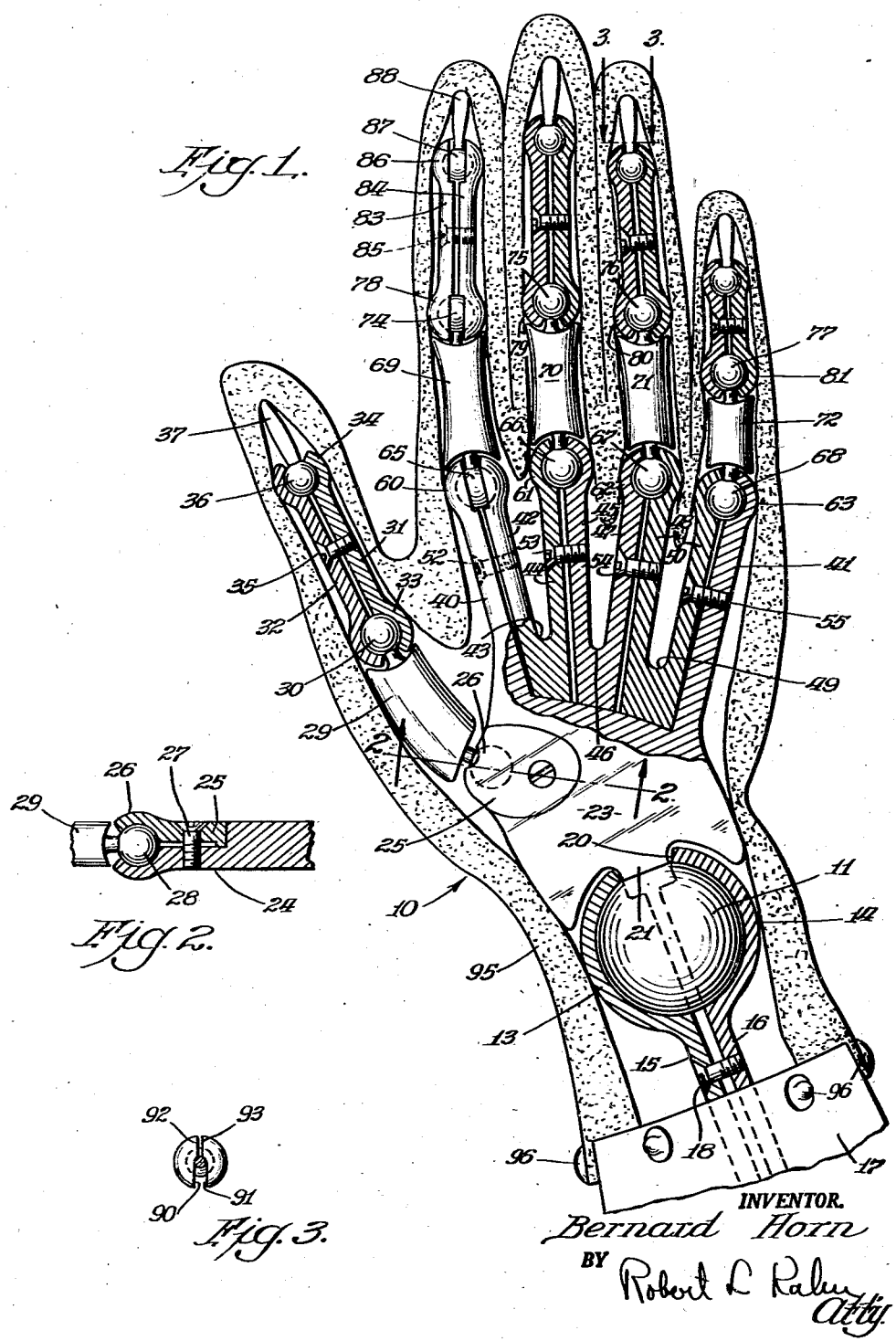

2,422,302

UNITED STATES PATENT OFFICE 2,422,302

ARTIFICIAL LIMB CONSTRUCTION

Bernard Horn, Chicago, Ill.

Application September 23, 1946, Serial No. 698,743

4 Claims. (Cl. 3—12)

This invention relates to an artifical limb construction and particularly to an artificial hand. It is essential that an artificial hand be light and strong and be susceptible to manipulation. While many artificial hands purport to fulfill these requirements, their construction has been characterized by complexity resulting in substantial weight. It is desirable that an artificial hand be mechanically simple, simulate a human hand and be capable of being maintained in a clean and sanitary condition. The invention hereinafter described fulfills these requirements to a high degree.

The invention in general provides a construction utilizing ball and socket joints. The ball and socket joints are preferably so designed that the friction between the ball and socket may be adjusted to any desired value. In the practical use of such a hand, the ball and sockets are adjusted so that considerable friction is provided. Thus, the hand and fingers may be preadjusted to any desired position and will maintain themselves in position.

A construction embodying the present invention is light and strong and may have a readily removable glove to simulate the flesh and muscles of a human hand. The resulting hand may not only be used as a prosthetic appliance by amputees but may also be used in manikins and display figures.

In order to fully understand the invention, reference will now be made to the drawing wherein Figure 1 is a view partly in section of an artificial hand and wrist embodying the present invention. Figure 2 is a sectional detail upon line 2—2 of Figure 1. Figure 3 is a sectional detail upon line 3—3 of Figure 1.

A hand, generally indicated by numeral 10 is supported by ball 11 within socket construction 12 to form a carpus or wrist. Ball 11 may be of plastic, such as Bakelite, or of metal as aluminum, stainless steel or any other suitable material. Ball 11 is gripped by two cupped members 13 and 14 forming socket 12, these two cupped members being carried at the ends of links 15 and 16. Links 15 and 16 may extend as far back as desired and, if necessary, may go to an elbow construction generally similar to the wrist structure. As shown here, stump 17 supports links 15 and 16. Links 15 and 16 are preferably integral with cupped members 13 and 14 and are formed of a suitable material having substantial strength and elasticity, such as steel as an example. They may have any desired transverse cross-section but may be rounded like the phalangeal links described later. Immediately adjacent the ball and socket construction, links 15 and 16 are clamped together by any suitable means such as bolt 18 threadedly engaging link portion 16. Link portion 15 is suitably countersunk to accommodate the bolt head, it being understood that bolt 18 turns loosely in link portion 15. Thus, bolt 18 provides a vise-like action on links 15 and 16 and controls the gripping action of the joint.

It is understood that cup portions 13 and 14 cover as much of the surface of ball 11 as necessary. However, cup portions 13 and 14 have open region 20 within which connecting portion 21 extends to ball 11. Region 20 is great enough so that a suitable range of adjustment of ball 11 with respect to socket 12 is provided. As shown here, connecting portion 21 has a width somewhat greater than the separation between opposing edges of cup members 13 and 14. Thus, adjustment of ball 11 with respect to socket 12 is possible in all planes to provide universal action.

While the ball and socket are shown as having smooth surfaces, it is possible to roughen one or both of the cooperating surfaces to increase the friction. It is also possible to make the ball and socket of dissimilar materials. Thus, ball 11 may be of brass, and socket 12 may be of steel. Connecting portion 21 is rigidly fastened to ball 11 in any suitable manner and extends away therefrom to metacarpal region 23. Metacarpal portion 23 has undercut part 24 cooperating with piece 25 to form socket 26. The socket forming members are maintained in position by bolt 27 as in socket 12. Socket 26 cooperates with ball 28 carried by member 29 simulating the proximal phalangeal bone of the first finger. Member 29 may be flat or cylindrical and carries ball 30 at the end thereof corresponding to the middle phalangeal joint. Ball 30 is engaged by links 31 and 32 forming socket 33 at ball 30 and socket 34 at the distal joint of the first finger. Links 31 and 32 are short enough in length so that one bolt 35 may be used to control the gripping action of the two sockets. It is understood that bolt 35 cooperates with the two links in a manner similar to bolt 18. Instead of one bolt 35, if desired, two separate tension adjusting means may be provided adjacent sockets 33 and 34. Cooperating with socket 35 is ball 36 carried by distal member 37.

Metacarpal portion 23 is shaped to provide links 40 and 41 forming part of the skeleton structure from which the second and fifth fingers respectively extend. Cooperating with link 40 is link 42 rigidly attached at base 43 to neighboring link 44 to form a generally U-shaped piece. Inasmuch as the various links are made of elastic material, it will be evident that some flexibility between two links will be possible.

Cooperating with link 44 is link 45 joined at base 46 with neighboring link 47. Link 47 cooperates with link 48 joined at base 49 to link 50. Links 40 and 42 have bolt 52 for adjusting the tension between them. Similarly, bolts 53, 54 and 55 are provided for the remaining sets of links.

Links 40 and 42 together cooperate to form socket 60. Links 44 and 45 provide socket 61. Links 47 and 48 provide socket 62, while links 50 and 41 cooperate to provide socket 63. Sockets 60 to 63 inclusive cooperate with balls 65 to 68 inclusive respectively to form proximal phalangeal or knuckle joints. Balls 60 to 68 are carried upon small extensions from rods 69 to 72 inclusive. These rods may either be flat or cylindrical and carry balls 74 to 77 inclusive upon suitable extensions at the upper ends thereof. The lengths of rods 69 to 72 inclusive are such as to simulate the normal phalangeal bones between the proximal and middle phalangeal joints.

Cooperating with balls 74 to 77 inclusive are sockets 78 to 81 inclusive. The sockets are formed from links in the same manner as described in connection with the first finger or thumb. Thus, the second or index finger, for example, has links 83 and 84 cooperating with bolt 85 for controlling the ball and socket action. Links 83 and 84 have socket 86 retaining ball 87 carrying member 88 to form a jointed or articulated distal phalangeal portion. The remaining fingers are similarly constructed. It is clear from the construction of the various joints that the clearances between the socket and ball members are such as to control the plane or planes in which articulation is possible. Thus, the middle phalangeal joints and distal phalangeal joints should be constructed so that desired articulation is possible. While the phalangeal articulation in a human hand is limited to a plane generally perpendicular to the palm, an artificial hand may be made to have a greater degree of freedom.

Those joints which permit bending in one direction only from a straight line position may be constructed generally along the lines as shown in Figure 3, for example. Thus, the socket forming members may have opposing edges 90 and 91 separated by a distance great enough to permit ball movement. It will be noted, however, that opposing edges 90 and 91 extend part way through the socket with edges 92 and 93 extending the remaining portion. Edges 92 and 93 are spaced close enough to prevent the ball retaining portion from moving between these edges. Thus, as shown, the tip of the fourth finger can only be bent upwardly from a straight position but cannot be bent downwardly or backwardly from a straight position.

The knuckle or proximal phalangeal joints are preferably constructed in a manner generally similar to the wrist joint so that a limited amount of universal articulation is provided. The angular extent of joint action from a straight position need not necessarily be the same in all directions. Thus, the knuckle joints should have substantial freedom to bend in such a manner as to bring the fingers toward the palm. Bending backward is not necessary or desirable. Some slight bending sideways may be provided. Thus, applying the construction of Figure 3 to a knuckle joint, the spacing between opposed edges 90 and 91 may be enlarged somewhat or even tapered to provide some side articulation.

The entire hand may be covered with a suitable rubber or plastic material 95 to simulate the appearance of a normal hand, or, if desired, to simulate a glove. This plastic covering is preferably removable to permit adjustment of the various joints. By suitable design of the plastic covering, the various pads and wrinkles in a normal hand and in normal fingers may be duplicated. By making such plastic material somewhat flexible, the same covering may be used for various sizes of hands. Padding may be inserted to fill out various spots. The entire cover may be fastened to the stump by snaps 96.

It is understood that the balls may be made adjustable and socket members fixed as far as grip adjustment of the joints are concerned.

What is claimed is:

1. An artificial hand comprising a palm portion, wrist portion, thumb and four fingers, said palm portion consisting of a solid member having one part extending toward the wrist, ball and socket means in said wrist to provide a joint, said one part of the palm being rigidly attached to one portion of said joint, jointed portions forming a thumb but attached to another portion of said palm and jointed portions being attached to a third portion of a palm for fingers, finger portions immediately adjacent to the palm consisting of two spaced links forming part of the second and fifth fingers respectively, three generally U shaped links disposed between said two spaced links, means for coupling the links in pairs to form four pairs of links for the second to fifth fingers inclusive, each pair of links having the free ends shaped to define a knuckle socket, rods having a ball at each end, each finger having one rod with a ball engaged by said knuckle socket, a pair of links for each finger beyond the corresponding rod and corresponding to the free half of each finger, each link being shaped to provide a socket at each end thereof, means for coupling said links together to provide a gripping action at each ball and socket joint, and a ball and finger tip extension for the outermost socket for all fingers.

2. In an artificial limb, an articulated construction comprising a rigid link carrying a ball at least at one end thereof, an elongated member in general alignment with said link, said elongated member having two cooperating cupped portions enclosing said ball to form a ball and socket joint, and means for urging said two cupped portions toward each other to grip the ball.

3. In an artificial hand, an articulated finger comprising a rigid link having a ball at least at one end thereof, a pair of rigid members having cupped portions at the ends thereof, two cooperating cupped portions at one end engaging said ball, a third link carrying at least one ball at its end, said third link having the ball between the cooperating cupped portions at the other end, and bolt means for tightening said two members toward each other to cause the cupped ends to grip the balls.

4. An articulated artificial finger construction comprising a distal link carrying a ball at the distal joint end, two members forming a phalangeal link, each member having a cupped part at each end, a proximal phalangeal link carrying a ball at the middle phalangeal joint, said cupped parts embracing the balls to form ball and socket joints for the distal and middle phalangeal joints respectively, means for retaining the two members in rigid relation to form said phalangeal link and grip the balls and a ball and socket mounting means functioning as a knuckle joint.

BERNARD HORN.

REFERENCES CITED

The following references are of record in the file of this patent:

UNITED STATES PATENTS

| Number | Name | Date |
|---|---|---|
| 1,484,913 | Surry | Feb. 26, 1924 |
| 370,774 | Fuller | Oct. 4, 1887 |
| 1,680,022 | Hodgson | Aug. 7, 1928 |

FOREIGN PATENTS

| Number | Country | Date |
|---|---|---|
| 76,240 | Austria | Apr. 25, 1929 |